P. KEY.
ROW GAGE.
APPLICATION FILED OCT. 13, 1911.
1,052,486.
Patented Feb. 11, 1913.
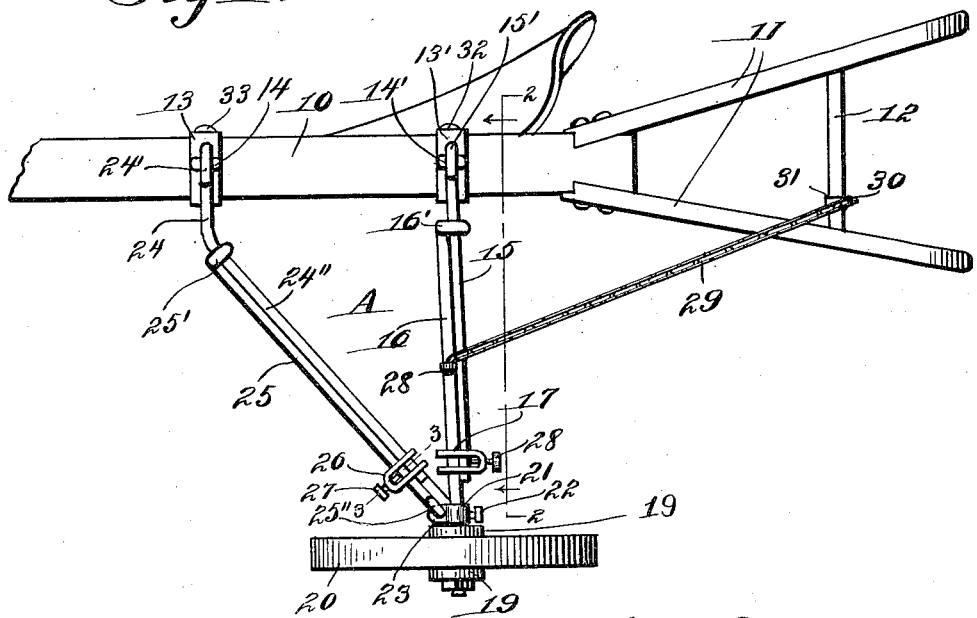
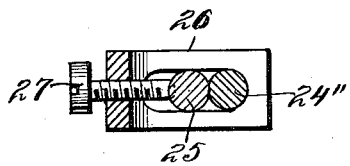
Witnesses
William C. Linton
Charles S. Wilson
Inventor
Percy Key.
By Wm C. W. Intere
Attorney
COLUMBIA PLANOGRAPH CO., WASHINGTON, D. C.

UNITED STATES PATENT OFFICE.

PERCY KEY, OF DE KALB, MISSISSIPPI.

ROW-GAGE.

1,052,486. Specification of Letters Patent. Patented Feb. 11, 1913.

Application filed October 13, 1911. Serial No. 654,476.

*To all whom it may concern:*

Be it known that I, PERCY KEY, a citizen of the United States, residing at De Kalb, in the county of Kemper and State of Mississippi, have invented certain new and useful Improvements in Row-Gages; and I do hereby declare the following to be a full, clear, and exact description of the invention, such as will enable others skilled in the art to which it appertains to make and use the same.

This invention relates to row gages, and is particularly designed to construct a gage which will be adjustable to various widths of rows or furrows, thereby increasing the adaptability of devices of this nature. The general type of this invention is known, commonly, as the wheel row gage and is swung upon each side of the cultivator or plow beam to which it is attached in order that the rows may be gaged upon either side of the plow.

Heretofore, gages have been constructed which have been adapted to operate upon either side of the plow beam, but the present invention contemplates a wheel gage which will be operable upon either side of the plow and at the same time be adjustable and provided with braces to overcome all lateral strains.

With the above and other objects in view, this invention consists in the construction, combination and arrangement of parts, all as hereinafter more particularly described, claimed and illustrated in the accompanying drawings wherein:

Figure 1 is a top plan view of a plow provided with a row gage forming the subject matter of the present invention; Fig. 2 is a section taken along line 2—2 of Fig. 1; Fig. 3 is a section taken along line 3—3 of Fig. 1; and Fig. 4 is a section illustrating the hook applied to the handle of the plow for retaining the gage in an elevated position for the purpose of transportation.

The row gage forming the subject matter of the present invention comprises a pair of brackets mounted on the upper face of the cultivator or plow beam, said brackets having bearings or loops formed thereon. A bracket adjacent to the handle of the beam, or the rear terminal thereof, has pivotally connected thereto a rod which extends normally at right angles to the beam, while the bracket at the forward terminal thereof has a similarly constructed rod mounted thereon, which operates at substantially an acute angle to said beam and converges toward the aforementioned rod. This rod and the rod at an acute angle to the cultivator beam is provided with the bracket at its outer terminal in which operates a set screw. A pair of auxiliary rods are slidably mounted upon the rods attached to the brackets carried by the cultivator beam, the rod thereof operating upon the rod at right angles to the cultivator beam being extended and provided with a wheel rotatably mounted upon the terminals thereof. The bracket and set screws located adjacent to this wheel or bearing form a connection between the rod at an angle to the cultivator beam and said rod carrying the gage.

Reference being had more particularly to the drawings, 10 indicates a cultivator or plow beam of any suitable construction, provided at its rear terminals with handles 11, between which is interposed the bar 12. A pair of U-shaped brackets 13 and 13' are mounted upon the beam 10 adjacent to the forward and rear terminals thereof, respectively. The brackets are provided with the loops or bearings 14 and 14', to which the row guide forming the subject matter of the present invention, is attached. A rod 15 is pivotally mounted with the loop or bearing 14' of the bracket 13' through the instrumentality of a loop 15' formed therein, said rod adapted to rest normally at right angles to the beam 10. An auxiliary rod 16 is slidably mounted upon the rod 15 through the instrumentality of the loop 16', and carries adjacent to its outer terminal a bracket 17 in which operates a set screw 18, which bracket is adjustable upon the rods 15 and 16 and provides a rigid and adjustable connection between the forward or upper terminals of these rods. The rod 16 is extended and has a bearing or head 19 mounted thereon, which carries the wheel gage 20, said wheel gage adapted to operate upon the ground on either side of the beam 10. Adjacent to the hub 19 of the wheel 20 is an adjustable bearing 21 upon the rod 16, which is provided with a set screw 22 adapted to engage said rod, said bearing being provided with an orificed projection 23 which is adapted to connect the braces to the structure hereinbefore described, as will hereinafter be more fully set forth. A rod 24 is pivotally mounted through the instrumentality of the loop 24' to the bearing or eye 14 of the bracket 13, and has its main body portion 24″ bent toward the rear terminal of the cultivator beam, thereby being adapted to rest at an acute angle to said beam and converge toward the rods 15 and 16. An auxiliary rod 25 is slidably mounted upon the oblique portion 24″ of the rod 24, through the medium of a loop 25′ formed in the rod 25 and operates through a bracket 26 and set screw 27 adjustably mounted upon the outer terminal of the oblique portion 24″ of the rod 24. The outer terminal of the rod 25 is provided with a loop 25″ which is pivoted in the orificed projection 23 of the bearing 21. From this construction it will be understood that the frame indicated generally as "A" may be swung about the beam 10 through the pivotal connection formed by the loops 15′ and 24′, in such a manner that the wheels 20 will operate upon the ground on either side of the beam as so desired. By loosening the set screws 18, 22 and 27, it will clearly be seen that the wheel 20 may be adjusted any desired distance from the beam 10, that is, within the limits of the adjustable feature, thereby permitting an adjustment of the gage to various distances desired between the rows.

A hook 28 is adjustably mounted upon the rod 16 and has secured thereto a chain 29, said chain extending to the bar 12 where it is definitely engaged by the hook 30 carried by the collar 31 encircling the bar 12. This structure permits the frame "A" to be raised and retained in a vertical position when it is desired to transport the plow, without operating the gage.

It is also to be understood that the gage may entirely be removed from the cultivator beam by detaching the bolts 32 and 33 which secure the brackets 13 and 13′ to the beam 10.

Having thus fully described my invention, what I claim as new and desire to secure by U. S. Letters Patent, is—

In a device of the class described, the combination with a plow beam having spaced bearing brackets secured thereto, of a gage frame secured to said brackets and adapted to be swung on opposite sides of said beam, the frame comprising front and rear telescoping bars, the rear frame bar comprising an inner section pivotally secured to one of said brackets and extending at right angles to the plow beam, and an outer section looped at its inner end about said first mentioned section and formed upon its outer end with a wheel spindle; the front frame bar comprising an inner section extending laterally and rearwardly and pivotally connected to the other of said brackets, and an outer section looped at its inner end about said last mentioned section; clamps encircling said telescoping bars to clamp them in any adjusted position, a connecting bracket sliable upon the outer section of the rear frame bar, means for locking said connecting bracket, the outer section of the front frame bar being looped through an eye formed in said bearing, and a gage wheel journaled upon the wheel spindle.

In testimony whereof I affix my signature in presence of two witnesses.

PERCY KEY.

Witnesses:
 W. J. Ross,
 W. Wallace Davis.

---

Copies of this patent may be obtained for five cents each, by addressing the "Commissioner of Patents, Washington, D. C."